(12) United States Patent
Dougherty et al.

(10) Patent No.: US 8,647,500 B2
(45) Date of Patent: Feb. 11, 2014

(54) INTEGRATED GAS AND LIQUID PHASE PROCESSING OF BIOCOMPONENT FEEDSTOCKS

(75) Inventors: Richard C. Dougherty, Moorestown, NJ (US); Michael A. Hayes, Washington, NJ (US); Benjamin S. Umansky, Fairfax, VA (US); William E. Lewis, Baton Rouge, LA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 411 days.

(21) Appl. No.: 13/168,287

(22) Filed: Jun. 24, 2011

(65) Prior Publication Data

US 2012/0000824 A1 Jan. 5, 2012

Related U.S. Application Data

(60) Provisional application No. 61/359,890, filed on Jun. 30, 2010.

(51) Int. Cl.
*C10G 45/00* (2006.01)

(52) U.S. Cl.
USPC .............................. 208/210; 208/89; 585/240

(58) Field of Classification Search
USPC ..................... 208/89, 210; 585/240
See application file for complete search history.

(56) References Cited

U.S. PATENT DOCUMENTS

| | | | |
|---|---|---|---|
| 3,412,016 A | 11/1968 | Graven | |
| 6,123,835 A | 9/2000 | Ackerson et al. | |
| 6,217,749 B1 * | 4/2001 | Espeillac et al. | 208/213 |
| 6,428,686 B1 | 8/2002 | Ackerson et al. | |
| 6,881,326 B2 | 4/2005 | Ackerson et al. | |
| 7,291,257 B2 | 11/2007 | Ackerson et al. | |
| 2005/0082202 A1 | 4/2005 | Ackerson et al. | |
| 2008/0173570 A1 | 7/2008 | Marchand et al. | |
| 2009/0095651 A1 * | 4/2009 | Leonard et al. | 208/49 |
| 2009/0095653 A1 | 4/2009 | Kokayeff et al. | |
| 2009/0095655 A1 * | 4/2009 | Kokayeff et al. | 208/59 |
| 2009/0095656 A1 | 4/2009 | Kokayeff et al. | |
| 2009/0107033 A1 * | 4/2009 | Gudde et al. | 44/308 |
| 2009/0301930 A1 | 12/2009 | Brandvold et al. | |

FOREIGN PATENT DOCUMENTS

| | | |
|---|---|---|
| EP | 0 819 752 B1 | 4/2001 |
| WO | 2007/125332 A1 | 11/2007 |
| WO | 2009/052025 A2 | 4/2009 |
| WO | 2010/002903 A2 | 1/2010 |

OTHER PUBLICATIONS

C. Schmitz, L. Datsevitch, A. Jess, "Deep desulfurization of diesel oil: kinetic studies and process-improvement by the use of a two-phase reactor with pre-saturator", Chemical Engineering Science 59 (2004) pp. 2821-2829.

* cited by examiner

*Primary Examiner* — Randy Boyer
*Assistant Examiner* — Juan Valencia
(74) *Attorney, Agent, or Firm* — Bruce M. Bordelon; Chad A. Guice

(57) ABSTRACT

A mineral feed can be hydrotreated in a trickle-bed reactor or other stage in a continuous gas-phase environment. The effluent from the hydrotreatment stage can be separated to remove gas-phase impurities. The remaining liquid effluent from the hydrotreating stage can then be introduced, in total or in part, into a second stage/reactor. A feed of biocomponent origin can also be introduced into the second stage/reactor. The second stage/reactor can be operated to perform deoxygenation of the mixture of biocomponent feed and hydrotreated liquid effluent in a continuous liquid phase environment.

16 Claims, 4 Drawing Sheets

INTEGRATED GAS AND LIQUID PHASE PROCESSING OF BIOCOMPONENT FEEDSTOCKS

CROSS-REFERENCE TO RELATED APPLICATIONS

This Application claims the benefit of Provisional U.S. Application No. 61/359,890, filed Jun. 30, 2010, the contents of which are hereby incorporated by reference herein.

FIELD OF THE INVENTION

The invention is related to the hydroprocessing of feeds to form a diesel fuel product.

BACKGROUND OF THE INVENTION

A variety of potential biological sources exist that can provide hydrocarbon molecules with chain lengths that are roughly appropriate for conversion into a diesel fuel. These biological sources can include vegetable fats or oils, animal fats or oils (including fish oils), or even fats or oils derived from algae. Based on regulatory activity by various governments, fuels derived from such biocomponent sources are likely to be increasingly important in the future.

Unfortunately, processing of biocomponent materials in conventional hydroprocessing equipment can be expensive from a refinery perspective. In particular, published literature reports of hydrogen consumption of biocomponent fuels during hydroprocessing indicate hydrogen needs in excess of 1000 scf/bbl (170 $Nm^3/m^3$). In addition to requiring large amounts of hydrogen, hydroprocessing of a biocomponent feed typically leads to production of CO and $CO_2$. These contaminant species can be pose problems for conventional hydrogen scrubbing systems, making it difficult to recycle the excess hydrogen used for processing the biocomponent feed. The byproduct gases are also known hydrotreating catalyst poisons.

International Publication No. WO 2010/002903 describes a multi-stages hydroprocessing process and apparatus. In the process, a fresh feed is divided into a series of portions. All of the hydrogen for processing the feed is introduced into a first reactor stage. Additional portions of feed are introduced into subsequent reactors. The initial reactor stages are described as having a continuous gas phase environment. Based on the addition of additional feed in subsequent stages, it is described that the final stage(s) have a continuous liquid phase environment. Optionally, a portion of the liquid product can be recycled and combined with the portion of the fresh feed entering the first reaction stage.

U.S. Published Patent Application No. 2009/0095653 describes a hydroisomerization process. The hydroisomerization is performed in a reactor that has a substantially continuous liquid phase. An excess of hydrogen gas can be present beyond the solubility limit of the feedstock. However, the flowing medium in the reactor is described as being substantially liquid-continuous. The excess hydrogen gas is described as allowing the liquid phase to remain saturated with hydrogen as the reaction proceeds. The hydrocarbon feed is described as being a Fischer-Tropsch feed or a hydroprocessed vegetable oil composed primarily of n-paraffins in the $C_8$ to $C_{30}$ carbon number range.

U.S. Pat. No. 7,291,257 describes a system and method for two phase hydroprocessing of a mineral feed. The method is described as allowing for hydroprocessing where the need to circulate hydrogen gas or a separate hydrogen phase through the catalyst is eliminated. Instead, the hydrogen for the hydroprocessing is dissolved in the feed, which can include a diluent to increase the overall amount of dissolved hydrogen available for reaction. The diluent is described as being a material having a high hydrogen solubility relative to the feed. The examples of diluents are all either recycled portions of processed feed or donor diluents that undergo a chemical change in order to provide hydrogen. Optionally, additional amounts of hydrogen gas may be present of about 10% or less relative to the total volume of the reactor.

U.S. Patent Application Publication No. 2009/0095651 describes a hydrocarbon conversion process for a mineral feed. The process involves two zones of substantially liquid-phase hydroprocessing. A substantially liquid-phase hydroprocessing zone is described as having hydrogen added to the feed stream in excess of the solubility limit so that a small vapor phase is also present. The effluent from the first zone is delivered to the second zone substantially undiluted by other hydrocarbon streams. A portion of the effluent from the second zone can be recycled to the input for the first zone.

U.S. Patent Application Publication No. 2009/0107033 describes a hydrogenation process for feeds containing carboxylic acids or esters. A first feed is treated with hydrogen, such as by hydrotreatment, in a first processing stage. The product from this stage is then combined with a feed containing carboxylic acids or esters, and treated to convert the carboxylic acids or esters into hydrocarbons.

U.S. Patent Application Publication No. 2008/0173570 describes a process for hydrotreating a mixture of petroleum cuts and oils of animal or vegetable origin. A petroleum cut is hydrotreated in a first catalyst bed. The effluent from this hydrotreatment is then combined with an animal or vegetable oil and hydrotreated in a second catalyst bed.

SUMMARY OF THE INVENTION

One aspect of the invention relates to a method for making a diesel fuel product, comprising: contacting a mineral feedstock having a sulfur content of at least about 500 wppm with a hydrotreating catalyst under effective hydrotreating conditions in a hydrotreatment reactor that includes a continuous gas phase to make a hydrotreated effluent; separating the hydrotreated effluent into at least a first diesel boiling range product, a hydrotreated liquid slip stream, and a gas phase product, the diesel boiling range product and the hydrotreated liquid slip stream having a sulfur content of about 50 wppm or less; mixing the hydrotreated liquid slip stream with a recycled product stream, and a biocomponent feed having an oxygen content of at least about 8 wt %, to form a mixed input stream; deoxygenating the mixed input stream under effective deoxygenation conditions in a deoxygenation stage having a continuous liquid phase environment to form a second diesel boiling range product and the recycled product stream, the mixed input stream having a first hydrogen need in the deoxygenation; and adjusting a ratio of the hydrotreated liquid slip stream and the biocomponent feed in the mixed input stream while maintaining a second hydrogen need of the mixed input stream in the deoxygenation to within about 5% of the first hydrogen need.

Another aspect of the invention relates to a method for making a diesel fuel product, comprising: contacting a mineral feedstock having a sulfur content of at least about 500 wppm with a hydrotreating catalyst under effective hydrotreating conditions in a hydrotreatment reactor that includes a continuous gas phase to make a hydrotreated effluent; separating the hydrotreated effluent to form a hydrotreated liquid effluent and a gas phase effluent containing $H_2S$ and $H_2$; passing the hydrotreated liquid effluent into a first separate volume of a divided wall column stripper; stripping the hydrotreated liquid effluent in the first separate volume to form a light ends fraction, a diesel boiling range product, and a hydrotreated liquid slip stream, the light ends fraction being passed into a common volume of the divided wall column stripper, the diesel boiling range product and the hydrotreated liquid slip stream having a sulfur content of about 50 wppm or less; mixing the hydrotreated liquid slip stream with a recycled product stream, and a biocomponent feed having an oxygen content of about 8 wt %, to form a mixed input stream; deoxygenating the mixed input stream under effective deoxygenation conditions in a deoxygenation stage having a continuous liquid phase environment to form a deoxygenated effluent; separating the deoxygenated effluent to form a deoxygenated liquid effluent and a second gas phase effluent containing $CO_2$ and CO; passing the deoxygenated liquid effluent into a second separate volume of a divided wall column stripper; and stripping the deoxygenated liquid effluent in the second separate volume to form a second light ends fraction, a second diesel boiling range product, and the recycled product stream, the second light ends fraction being passed into the common volume of the divided wall column stripper.

DETAILED DESCRIPTION OF THE PREFERRED EMBODIMENTS

Overview

Figure 1:
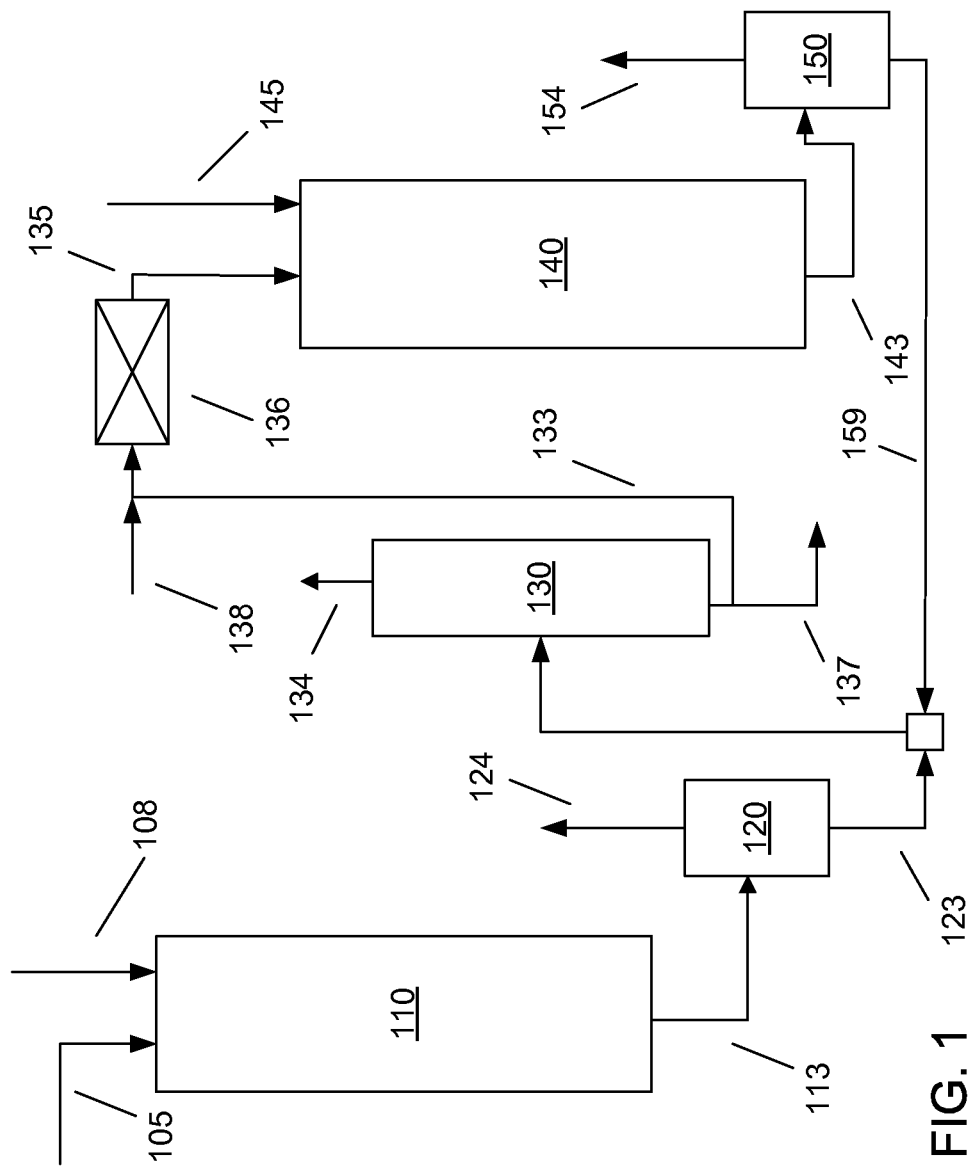
FIG. 1 schematically shows a reaction system according to an embodiment of the invention.

In various embodiments, systems and methods are provided for producing diesel fuel from a mixture of mineral and biocomponent feedstocks. A mineral feed can be hydrotreated, e.g., in a trickle-bed reactor or other stage in a continuous gas phase environment. The effluent from the hydrotreatment stage can be separated to remove gas phase impurities. The remaining liquid effluent from the hydrotreating stage can then be introduced, in total or in part, into a second stage or reactor. A feed of biocomponent origin can also be introduced into the second stage or reactor. The second stage or reactor can be operated to perform deoxygenation of the mixture of biocomponent feed and hydrotreated liquid effluent in a continuous liquid phase environment. Note that, for convenience, the gas-phase continuous hydrotreatment stage may be referred to as a "first" stage while the liquid-continuous phase may be referred to as a "second" stage. It is understood that the gas phase hydrotreatment stage and the liquid-continuous phase stage can include any convenient number of stages, reactors, and/or beds, whether described herein as a single stage, reactor, and/or bed or as multiple stages, reactors, and/or beds.

Biocomponent feeds can present a number of challenges for processing in conventional refinery equipment. In a typical trickle-bed reactor, a large excess of hydrogen is typically used during processing of a feed. This excess hydrogen is then generally recycled for use in the same process and/or in other refinery processes. Unfortunately, deoxygenating a biocomponent feed can produce substantial amounts of CO and $CO_2$. The CO generated from processing a biocomponent feed can be difficult to separate from a hydrogen-containing stream. Additionally or alternatively, the generated $CO_2$ can contribute to an increasingly corrosive environment within the equipment, which may require an upgrade of materials for any equipment exposed to the corrosive environment. Using a reactor with a continuous liquid phase environment for deoxygenation of the biocomponent feed can mitigate and/or avoid some/all of these problems. First, a relatively large excess of hydrogen is typically not required for processing in a continuous liquid phase environment. Instead, an amount of hydrogen comparable to the hydrogen need for the feedstock can be used. This avoids the need to purify and recycle excess hydrogen from the stage used for processing the biocomponent feedstock. Because recycling of hydrogen is not necessary, the number of separation components downstream of the reactor exposed to a potentially corrosive environment can also be reduced.

In an embodiment, the input streams to this second reaction stage can also include a portion of the effluent recycled from the second reaction stage. By combining the biocomponent feed with both a recycled effluent portion and a hydrotreated mineral portion, the processing requirements for the reactor and the characteristics of the product from the second reactor can be controlled independently. For example, a biocomponent feed can have a relatively high hydrogen need for processing, as compared to the solubility of hydrogen in the feed. Rather than attempting to increase the amount of hydrogen delivered to a stage to match the hydrogen need for an undiluted biocomponent feed, the biocomponent feed can be blended or diluted with another feed that has a lower relative hydrogen need. Examples of feeds with lower relative hydrogen demands can include previously processed feeds, such as previously hydrotreated mineral feeds and/or recycled products.

In various embodiments, a biocomponent feed can be introduced into a processing stage with both a hydrotreated mineral feed and a recycled product stream. Adding both a treated mineral feed and a recycled product portion allows for greater control during processing. In addition to being able to select a ratio of fresh biocomponent feed relative to feed having a lower relative hydrogen demand, the make-up of the lower relatively hydrogen demand feed can additionally or alternately be selected by controlling the ratio of hydrotreated mineral feed and recycled product.

Another challenge posed by the processing of biocomponent feeds is related to the heat generated during hydroprocessing of a fresh biocomponent feed. In a conventional trickle-bed reactor, processing of a biocomponent feed can result in relatively large exotherms, perhaps due to the relatively large heteroatom content of biocomponent feeds relative to mineral feeds. Such relatively large exotherms can lead to flow maldistribution, localized hot spots, reaction activity changes, and/or reaction selectivity degradation. In a conventional trickle-bed reactor, one solution to problems with exotherms can be to reduce the relative amount of biocomponent feed versus a previously processed feed (or other feed with a reduced hydrogen demand) introduced into a reactor. By contrast, a reaction stage having a liquid-continuous environment can advantageously provide a better "heat sink" for any exotherm generated during hydroprocessing of a biocomponent feed, which can allow for greater flexibility in selecting the relative amounts of biocomponent feed and previously processed feed.

Feedstocks

In various embodiments of the invention, the feedstock can include feeds from biocomponent sources, such as vegetable, animal, fish, and/or algae. Generally, these biological materials include vegetable fats/oils, animal fats/oils, fish oils, pyrolysis oils, and algae lipids/oils, as well as components of such materials. More specifically, the lipid material includes one or more type of lipid compounds. Lipid compounds are typically biological compounds that are insoluble in water, but soluble in nonpolar (or fat) solvents. Non-limiting examples of such solvents include alcohols, ethers, chloroform, alkyl acetates, benzene, and combinations thereof Major classes of lipids include, but are not necessarily limited to, fatty acids, glycerol-derived lipids (including fats, oils and phospholipids), sphingosine-derived lipids (including ceramides, cerebrosides, gangliosides, and sphingomyelins), steroids and their derivatives, terpenes and their derivatives, fat-soluble vitamins, certain aromatic compounds, and long-chain alcohols and waxes.

In living organisms, lipids generally serve as the basis for cell membranes and as a form of fuel storage. Lipids can also be found conjugated with proteins or carbohydrates, such as in the form of lipoproteins and lipopolysaccharides.

Examples of vegetable oils that can be used in accordance with this invention include, but are not limited to rapeseed (canola) oil, soybean oil, coconut oil, sunflower oil, palm oil, palm kernel oil, peanut oil, linseed oil, tall oil, corn oil, castor oil, jatropha oil, jojoba oil, olive oil, flaxseed oil, camelina oil, safflower oil, babassu oil, tallow oil and rice bran oil.

Vegetable oils as referred to herein can also include processed vegetable oil material. Non-limiting examples of processed vegetable oil material include fatty acids and fatty acid alkyl esters. Alkyl esters typically include $C_1$-$C_5$ alkyl esters. One or more of methyl, ethyl, and propyl esters are preferred.

Examples of animal fats that can be used in accordance with the invention include, but are not limited to, beef fat (tallow), hog fat (lard), turkey fat, fish fat/oil, and chicken fat. The animal fats can be obtained from any suitable source including restaurants and meat production facilities.

Animal fats as referred to herein also include processed animal fat material. Non-limiting examples of processed animal fat material include fatty acids and fatty acid alkyl esters. Alkyl esters typically include $C_1$-$C_5$ alkyl esters. One or more of methyl, ethyl, and propyl esters are preferred.

Algae oils or lipids are typically contained in algae in the form of membrane components, storage products, and metabolites. Certain algal strains, particularly microalgae such as diatoms and cyanobacteria, contain proportionally high levels of lipids. Algal sources for the algae oils can contain varying amounts, e.g., from 2 wt % to 40 wt % of lipids, based on total weight of the biomass itself.

Algal sources for algae oils include, but are not limited to, unicellular and multicellular algae. Examples of such algae include a rhodophyte, chlorophyte, heterokontophyte, tribophyte, glaucophyte, chlorarachniophyte, euglenoid, haptophyte, cryptomonad, dinoflagellum, phytoplankton, and the like, and combinations thereof. In one embodiment, algae can be of the classes Chlorophyceae and/or Haptophyta. Specific species can include, but are not limited to, *Neochloris oleoabundans, Scenedesmus dimorphus, Euglena gracilis, Phaeodactylum tricornutum, Pleurochrysis camerae, Prymnesium parvum, Tetraselmis chui,* and *Chlamydomonas reinhardtii.*

The feedstock can include varying amounts of feedstreams based on biocomponent sources. Advantageously, the feed can include at least about 0.1 wt % of feed based on a biocomponent source, for example at least about 0.5 wt %, at least about 1 wt %, at least about 3 wt %, at least about 5 wt %, at least about 10 wt %, at least about 15 wt %, or at least about 20 wt %. In such embodiments, the feed can additionally or alternately include about 60 wt % or less of biocomponent feed, for example about 50 wt % or less, about 40 wt % or less, about 30 wt % or less, or about 25 wt % or less.

The biocomponent feeds useful in the present invention can include any of those which comprise primarily triglycerides and free fatty acids (FFA). The triglycerides and FFAs typically contain aliphatic hydrocarbon chains in their structure having from 8 to 36 carbons, preferably from 10 to 26 carbons, for example from 12 to 22 carbons, from 12 to 18 carbons, or from 14 to 22 carbons. Types of triglycerides can be determined according to their fatty acid constituents. The fatty acid constituents can be readily determined using Gas Chromatography (GC) analysis. This analysis involves extracting the fat or oil, saponifying (hydrolyzing) the fat or oil, preparing an alkyl (e.g., methyl) ester of the saponified fat or oil, and determining the type of (methyl) ester using GC analysis. In one embodiment, a majority (i.e., greater than 50%) of the triglyceride present in the lipid material can be comprised of $C_{10}$ to $C_{26}$ fatty acid constituents, based on total triglyceride present in the lipid material. Further, a triglyceride is a molecule having a structure identical to the reaction product of glycerol and three fatty acids. Thus, although a triglyceride is described herein as being comprised of fatty acids, it should be understood that the fatty acid component does not necessarily contain a carboxylic acid hydrogen. Additionally or alternately, a majority of triglycerides present in the biocomponent feed can preferably be comprised of $C_{12}$ to $C_{18}$ fatty acid constituents, based on total triglyceride content. Other types of feed that are derived from biological raw material components can include fatty acid esters, such as fatty acid alkyl esters (e.g., FAME and/or FAEE).

The feedstocks according to the invention can contain oxygen-containing compounds (abbreviated as "oxygen" or "oxygen content"), nitrogen-containing compounds (abbreviated as "nitrogen" or "nitrogen content"), and/or sulfur-containing compounds (abbreviated as "sulfur" or "sulfur content").

Biocomponent based diesel boiling range feedstreams typically have relatively low nitrogen and sulfur contents. For example, a biocomponent based feedstream can contain up to about 300 wppm nitrogen, for example up to about 100 wppm nitrogen. Instead of nitrogen and/or sulfur, the primary heteroatom component in biocomponent feeds is oxygen. Biocomponent diesel boiling range feedstreams, e.g., can include as much as about 14 wt % oxygen content, as much as about 12 wt % oxygen content, or as much as about 10 wt % oxygen content. Suitable biocomponent diesel boiling range feedstreams, prior to hydrotreatment, can include at least about 5 wt % oxygen content, for example at least about 8 wt % oxygen content. Additionally or alternately, a biocomponent feedstream, prior to hydrotreatment, can include an olefin content of at least about 3 wt %, for example at least about 5 wt % or at least about 10 wt %. The biocomponent portion of the feedstock can have been previously hydrotreated, or not previously hydrotreated (fresh).

In various embodiments of the invention, the feedstock can additionally or alternately include a mineral hydrocarbon portion. A mineral hydrocarbon feedstock refers to a hydrocarbon feedstock derived from crude oil that has optionally been subjected to one or more separation and/or other refining processes. Mineral hydrocarbon feedstocks useful according to the methods of the invention can include petroleum feedstocks boiling in the diesel range or at higher temperatures. Additionally or alternately, suitable feedstocks can include gas oils produced by the distillation of crude oil at approximately atmospheric pressure. A crude oil distillation tower can generally produce several grades of atmospheric gas oils. Other examples of mineral hydrocarbon feedstocks can include, but are not limited to, vacuum gas oils, demetallized oils, coker distillates, cat cracker distillates, jet fuel boiling range distillate fraction, kerosene boiling range distillate fraction, coal liquids, and combinations thereof.

The feedstock can have an initial boiling point of at least about 115° C., for example at least about 140° C. or at least about 170° C. Further, a feed can be characterized based on the portion of the feed that boils at a temperature and/or based on measurable properties such as cold flow properties (e.g., cloud point). For instance, a T5 boiling point can be defined as the temperature at which 5% of the feed will boil. Thus, when the feedstock is characterized based on boiling point range, the feedstock can additionally or alternately have a T5 boiling point of at least about 150° C., for example at least about 175° C. or at least about 190° C. Further additionally or alternately, the feedstock can have a final boiling point of about 455° C. or less, or about 440° C. or less, or about 425° C. or less. Still further additionally or alternately, the feedstock can have a T95 boiling point of about 440° C. or less, for example about 425° C. or less or about 400° C. or less. When the feed is characterized based on cloud point, the cloud point of the feedstock can additionally or alternately be about 50° F. (about 10° C.) or less, for example about 40° F. (about 4° C.) or less, about 25° F. (about –4° C.) or less, or about 10° F. (about –12° C.) or less. Further additionally or alternately, the cloud point of the feedstock can be at least about 5° F. (about –15° C.), for example at least about 15° F. (about –9° C.), at least about 25° F. (about –4° C.), at least about 32° F. (about 0° C.), or at least about 40° F. (about 4° C.).

In mineral feedstocks generally, at least a majority of the nitrogen can be in the form of organonitrogen compounds. Additionally or alternately, at least a majority of the sulfur can be in the form of organosulfur compounds. The mineral feedstreams suitable for use in various embodiments can have a nitrogen content from about 50 wppm to about 6000 wppm, preferably from about 50 wppm to about 2000 wppm, from about 50 wppm to about 1500 wppm, or from about 75 wppm to about 1000 wppm. Additionally or alternately, mineral feedstreams suitable for use herein can have a sulfur content from about 100 wppm to about 40,000 wppm, for example from about 100 wppm to about 30,000 wppm or from about 200 wppm to about 20,000 wppm, preferably from about 200 wppm to about 10,000 wppm, from about 200 wppm to about 5000 wppm, or from about 350 wppm to about 2500 wppm sulfur.

Initially, a predominantly mineral hydrocarbon feedstock (optionally comprising less than about 20 wt % biocomponent feed) can be hydrotreated in a first hydrotreatment stage. At least a portion of the effluent from the mineral feed hydrotreatment can then be combined with a biocomponent feed for processing in a second stage. A portion (less than 100 vol %) of the product from the second stage can also be recycled as an input to the second stage. The biocomponent feed, which can contain at least about 5 wt % of oxygen, or at least about 8 wt %, can be referred to as a fresh feed for the second stage.

Additionally or alternately, the input stream(s) to the second stage can have a weight ratio of hydrotreated mineral feed to biocomponent feed of about 10:1 or less, for example of about 5:1 or less, of about 2:1 or less, of about 1:1 or less, or of about 1:2 or less. Further additionally or alternately, the weight ratio of hydrotreated mineral feed to biocomponent feed can be at least about 1:10, for example at least about 1:5, at least about 1:2, at least about 1:1, or at least about 2:1. Still further additionally or alternately, the weight ratio of biocomponent feed to recycled product can be about 10:1 or less, for example about 5:1 or less, about 2:1 or less, about 1:1 or less, or about 1:2 or less. Yet further additionally or alternately, the weight ratio of biocomponent feed to recycled product can be at least about 1:10, for example at least about 1:5, at least about 1:2, at least about 1:1, or at least about 2:1.

In embodiments where the reactor includes a recycle loop for recycling a portion of the liquid effluent from the reactor, recycling of a portion of the product can assist with maintaining temperature control in the reactor. Whatever the reason, the amount of product recycle can generally be from about 5% to about 95% of the total liquid effluent by volume. In some embodiments, the amount of product recycle can be at least about 20 vol %, for example at least about 30 vol % or at least about 50 vol % of the liquid effluent. Additionally or alternately, the amount of product recycle can be about 90 vol % or less, for example about 75 vol % or less or about 60 vol % or less of the liquid effluent. In one embodiment, the amount of product recycle can be from about 30 vol % to about 70 vol % of the liquid effluent.

As described above, the total feed into the stage for processing the biocomponent feed can include at least three input streams. The input streams can include the fresh biocomponent feed, a recycled product stream, and a slip stream of hydroprocessed mineral feed. Because the recycled product stream and the slip stream of hydroprocessed mineral feed have been previously processed, these streams are each expected to have a relatively low hydrogen need. As a result, changes to the hydrogen need of the total feed into the second or biocomponent processing stage can be primarily related to changes in the amount of the fresh biocomponent feed. If the percentage of fresh biocomponent feed in the input remains relatively constant (assuming relatively uniform oxygen content in the fresh biocomponent feed), then the hydrogen need of the total feed can also stay relatively constant. One example of this involves adjusting the ratio of the hydrotreated mineral product and the recycled product in order to maintain about the same combined ratio of these previously processed streams to the raw biocomponent feed, thus maintaining a similar hydrogen need in that stage. Maintaining a similar hydrogen need can correspond to maintaining the hydrogen need to within 10% of the hydrogen need prior to adjustment, for example to within about 5% of the hydrogen need prior to adjustment. Note that maintaining a similar hydrogen need is a distinct concept from the amount of hydrogen provided into the reactor. Maintaining a similar hydrogen need refers to the amount of hydrogen needed for hydroprocessing. The hydrogen need for a feed is not directly related to the amount of hydrogen that can be provided to a reactor/reaction stage, even when the hydrogen is largely/completely dissolved in the input streams, with any amount of additional hydrogen being optionally added separately (e.g., axially) to a reactor/stage.

In some situations, a change may occur in one or more of the input streams to the biocomponent processing stage. For example, if the source of the biocomponent feed is changed, the new biocomponent source may have a higher or lower relative hydrogen need, e.g., for deoxygenation. Additionally or alternately, smaller changes in the hydrogen need could occur, due to changes in the hydrogen need for the slip stream of hydrotreated mineral feed. If the nature of the input streams to the biocomponent processing stage changes, the relative amounts of some or all of the biocomponent feed, recycled product stream, and slip stream of hydroprocessed mineral feed can be modified. In some instances, the relative amount of the recycled product stream in the total input can be used to adjust to changes in the hydrogen need. For example, if a new biocomponent feed source has a higher or lower relative hydrogen need (and/or if the same biocomponent feed source has a variable hydrogen need that increases or decreases for a time), the relative amount of recycled product can be increased or decreased, respectively, to compensate.

The content of sulfur, nitrogen, oxygen, and olefins in a feedstock created by blending two or more feedstocks can typically be determined using a weighted average based on the blended feeds. For example, a mineral feed and a biocomponent feed can be blended in a ratio of about 80 wt % mineral feed and about 20 wt % biocomponent feed. If the mineral feed has a sulfur content of about 1000 wppm, and the biocomponent feed has a sulfur content of about 10 wppm, the resulting blended feed could be expected to have a sulfur content of about 802 wppm. In various embodiments, an input stream to the second stage containing a blend of a biocomponent feed, a hydrotreated mineral feed, and a recycled product can have an oxygen content of at least about 1 wt %, for example at least about 2 wt %, at least about 4 wt %, or at least about 5 wt %.

Hydrogen can be introduced into the reactor or stage having a continuous liquid phase environment in one or more of several manners. One option for introducing hydrogen into the stage can be to at least partially dissolve hydrogen into a liquid input stream to the input stage, perhaps even at approximately the solubility limit (i.e., physical, not chemical, saturation) of hydrogen in the input stream. If hydrotreated mineral effluent, biocomponent feed, and recycled product are introduced into the second stage as separate input streams, then one or more of these input streams can have hydrogen fully or partially dissolved therein. Additionally or alternately, if the streams are combined prior to entering the liquid-continuous stage, hydrogen can be fully or partially dissolved in the combined stream, e.g., at approximately the solubility limit. Optionally, additional hydrogen can be introduced with a (physically, not chemically) saturated input stream as a gas-phase flow, so long as the liquid phase is still a continuous phase in the reaction zone/bed/stage.

An additional or alternate option for introducing hydrogen into the liquid-continuous reactor/stage can be to add hydrogen gas to the reactor/stage, e.g., at axial positions along the reactor/stage. As the input streams travel downstream through the reactor/stage, the hydrogen introduced with the input streams can be consumed. This hydrogen can be supplemented by introducing one or more input gas flows of hydrogen into downstream locations in the reactor. Additionally or alternately, hydrogen can be introduced by withdrawing a portion (e.g., a slip stream) of the partially processed liquid in the liquid-continuous reactor, fully or partially dissolving hydrogen in the withdrawn portion, and then returning the hydrogen-laden portion to the reactor.

Hydrotreating Stage—Continuous Gas-Phase Environment

In various embodiments, the feedstock can be hydrotreated in one or more hydrotreating stages and/or reactors. A hydrotreatment stage can be in any suitable type of hydrotreatment reactor, such as a trickle-bed reactor or another type of reactor that can include a continuous gas phase. A hydrotreatment stage can involve exposing the feedstock to a suitable hydrotreating catalyst in the presence of hydrogen under hydrotreating conditions.

A hydrotreatment catalyst can contain at least one of Group VIB and/or Group VIII metals, optionally on a support. Examples of suitable (optional) support materials can include alumina, silica, titania, zirconia, silica-alumina, combinations thereof, or any other suitable refractory material. Examples of Group VIB metals can include molybdenum and/or tungsten. Examples of Group VIII materials can include nickel, cobalt, and/or iron. For a supported catalyst, when present, the amount of Group VIB metal(s) can be at least about 1 wt %, for example at least about 5 wt % or at least about 10 wt %. Additionally or alternately, the amount of Group VIB metal(s) can be about 25 wt % or less, for example about 20 wt % or less or about 15 wt % or less. Further additionally or alternately, when present, the amount of Group VIII metal(s) can be at least about 0.5 wt %, for example at least about 1 wt %, at least about 2 wt %, or at least about 5 wt %. Still further additionally or alternately, the amount of Group VIII metal(s) can be about 30 wt % or less, for example about 25 wt % or less, about 20 wt % or less, about 15 wt % or less, or about 10 wt % or less. When the hydrotreatment catalyst is a bulk catalyst, the presence of a support material, such as a refractory metal oxide, can be optional and generally, if present, will comprise about 20 wt % or less of the catalyst, for example about 15 wt % or less, about 10 wt % or less, or about 5 wt % or less. Thus, such bulk metal catalysts can include up to about 95 wt % of a the Group VIB and/or Group VIII metal(s), for example up to about 90 wt %, up to about 85 wt %, or up to about 80 wt %.

The hydrotreating conditions can include one or more of: a temperature from about 260° C. to about 425° C., for example from about 300° C. to about 400° C.; a total pressure of at least about 300 psig (about 2.1 MPag), for example at least about 350 psig (about 2.4 MPag) or at least about 400 psig (about 2.8 MPag); a total pressure of about 3000 psig (about 20.7 MPag) or less, for example about 1500 psig (about 10.3 MPag) or less, or about 800 psig (about 5.5 MPag) or less; a liquid hourly space velocity (LHSV) of at least about $0.1\ hr^{-1}$, for example at least about $0.2\ hr^{-1}$, at least about $0.4\ hr^{-1}$, or at least about $0.5\ hr^{-1}$; an LHSV of about $15\ hr^{-1}$ or less, for example about $10\ hr^{-1}$ or less, about $5\ hr^{-1}$ or less, about $2\ hr_{-1}$ or less, about $1.5\ hr^{-1}$ or less, or about $1.2\ hr^{-1}$ or less (note that the LHSV refers to the space velocity relative to catalyst for the hydrotreating stage(s), and therefore does not reflect the catalyst volume of any subsequent stage); a hydrogen treat gas rate of at least about 500 scf/bbl (about 85 $Nm^3/m^3$), for example at least about 1000 scf/bbl (about 170 $Nm^3/m^3$); and a hydrogen treat gas rate of about 10000 scf/bbl (about 1700 $Nm^3/m^3$) or less, for example about 5000 scf/bbl (about 850 $Nm^3/m^3$) or less.

After hydrotreatment, a separation device can be used to separate out gaseous impurities and excess hydrogen prior to passing the hydrotreated feedstock to the liquid-continuous stage. The separation device can be a separator, a stripper, a fractionator, or another device, or another combination of devices suitable for separating gas-phase products from liquid-phase products. For example, a separator stage can be used to remove various contaminants, such as $H_2S$ and $NH_3$, formed during hydrotreatment, as well as other gas phase species such as $H_2$ or any low boiling products such as light ends. The separator stage can be a hot or cold separation stage, or a combination of hot and cold separation. The separation stage can operate at a pressure similar to the prior hydroprocessing stage, which can be referred to as a high pressure separation stage, or the pressure can be allowed to drop across the separation stage.

In an embodiment, the gas phase effluent from a separation stage can be used to provide recycled hydrogen for a hydrotreatment stage. The gas-phase effluent can be treated to remove contaminants in the gas, such as $H_2S$ and/or $NH_3$. Optionally, light ends and/or other low boiling fractions can also be removed at this time, or they can be removed at a later time, e.g., via an additional stripping and/or fractionation step. The remaining gas stream can have an $H_2$ concentration suitable for use in further hydroprocessing. This stream can be compressed, if necessary, to provide sufficient pressure for introducing the stream back into a hydrotreatment stage.

The hydrotreated mineral feed can then be split into at least two fractions. A first of the at least two fractions can correspond to a liquid product or a diesel fuel product, while a second of the at least two fractions can correspond to a slip stream that can be used as an input stream for the deoxygenation stage.

Deoxygenation Stage—Continuous Liquid Phase Environment

One option for deoxygenating a biocomponent feedstock can be to use a liquid-continuous phase in the reactor/stage/bed. Traditionally, hydroprocessing has been conducted in gas-continuous phase reactors, such as trickle-bed reactors, where an excess of gas results in a continuous gas phase in the reactor. In a liquid-continuous reactor according to the invention, the feedstock can be exposed to one or more beds of catalyst in one or more stages. The catalyst can comprise or be a hydrotreating catalyst, hydrocracking catalyst, dewaxing catalyst, aromatic saturation catalyst, another convenient type of catalyst, or a catalyst that exhibits a combination of these functions. The liquid feed can enter from the top or upper portions of the reactor(s)/bed(s)/stage(s) and can flow downstream through the reactor. This downstream liquid flow can assist in allowing the catalyst to remain in place (e.g., fixed) in the catalyst bed.

A hydroprocessing process can typically involve exposing a feed to a catalyst in the presence of hydrogen. Without being bound by any particular theory, in a conventional trickle-bed reactor, the reactor can be operated so that three "phases" are present in the reactor. The hydroprocessing catalyst corresponds to the solid phase. Another substantial portion of the reactor volume is occupied by a gas phase, typically including hydrogen, optionally some diluent gases, and other gases such as contaminant gases that can form during hydroprocessing. The hydrogen gas in the gas phase is typically present in substantial excess relative to the amount required for the hydroprocessing reaction. In a conventional trickle-bed reactor, the solid hydroprocessing catalyst and the gas phase can occupy at least about 80% of the reactor volume, for example at least about 85% or at least about 90%. The third "phase" can correspond to the liquid feedstock. In a conventional trickle-bed reactor, the feedstock may only occupy a small portion of the volume, such as less than about 20%, for example less than about 10% or less than about 5%. As a result, the liquid feedstock may not form a continuous phase. Instead, the liquid "phase" may include, for example, thin films of feedstock that coat the hydroprocessing catalyst particles.

Without being bound by any particular theory, a liquid-continuous reactor provides a different type of processing environment as compared to a trickle-bed reactor. In a liquid-continuous reactor, the reaction zone can be primarily composed of two phases. One phase can be a solid phase corresponding to the hydroprocessing catalyst. The second phase can be a liquid phase corresponding to the feedstock, which can be present as a continuous phase in a liquid-continuous reactor. In an embodiment, the hydrogen that will be consumed during the hydroprocessing reaction can be dissolved in the liquid phase. Depending on the quantity of hydrogen used, a portion of the hydrogen could also be in the form of bubbles of hydrogen in the liquid, in which case it would be assumed that the hydrogen was dissolved in the liquid phase at approximately the solubility limit (i.e., the liquid phase can be saturated with hydrogen, but this form of the term "saturate" is meant here physically rather than chemically; in the context of solubility of gas in liquid, as used herein, the phrase "approximately the solubility limit" should be understood to mean a concentration corresponding to at least 85% of the solubility limit, preferably to at least 90% of the solubility limit, for example to at least 95% of the solubility limit or to at least 99% of the solubility limit, which can, of course, include super-saturated solutions, that may correspond to up to 115% of the solubility limit, preferably to up to 110% of the solubility limit, for example to up to 105% of the solubility limit). Thus, the gas phase hydrogen would correspond to hydrogen that is in addition to the hydrogen dissolved in the liquid phase. In practical embodiments, hydrogen dissolved in the liquid phase can be depleted as the reactions progress in/through the liquid-continuous reactor. In such embodiments, hydrogen originally present in the form of gaseous bubbles can dissolve into the liquid phase to re-saturate the liquid phase and provide additional hydrogen for reaction. In various embodiments, the volume occupied by a gas phase in the liquid-continuous reactor can be less than about 10% of the reactor volume, or less than about 5%.

The liquid feed to the dewaxing reactor can be mixed (e.g., well-mixed) with a hydrogen-containing treat gas. The hydrogen-containing treat gas can contain at least about 50 vol % hydrogen, for example at least about 80 vol %, at least about 90 vol %, at least about 95 vol %, or at least about 99 vol % hydrogen. Excess gas can be vented from the mixture before it enters the reactor, and/or excess gas can be vented directly from the reactor. The liquid level in the reactor can be controlled so that the catalyst in the reactor is substantially (e.g., completely) wetted.

In some embodiments, the hydroprocessing reactions in a bed, stage, and/or reactor can require more hydrogen than can be dissolved in the liquid phase. In such embodiments, one or more techniques can be used to provide additional hydrogen for the hydroprocessing reaction. One option can be to recycle a portion of the product from the reactor. A recycled portion of product has already passed through a hydroprocessing stage, and therefore will likely have a reduced hydrogen consumption as it passes through the hydroprocessing stage again. Additionally or alternatively, the solubility of the recycled feed can be higher than a comparable unprocessed feed. As a result, including a portion of recycled product with fresh feed can increase the amount of hydrogen available for reaction with the fresh feed.

Additionally or alternatively, additional streams of hydrogen can be introduced into a reactor directly. One or more additional hydrogen streams can be introduced at any convenient location in a reactor. The additional hydrogen streams can include a stream of make-up hydrogen, a stream of recycled hydrogen, any other convenient hydrogen-containing stream, or a combination thereof. In some embodiments, both product recycle and injection of additional hydrogen streams along the axial dimension of the reactor can be used to provide sufficient hydrogen for a reaction.

One example of a process that can be performed in a liquid-continuous reactor includes a heteroatom removal process, such as deoxygenation. Deoxygenation can be performed by exposing a biocomponent feedstock to a hydrotreating catalyst under effective deoxygenation conditions. Effective deoxygenation conditions can include one or more of: a temperature of at least about 260° C., for example at least about 300° C.; a temperature of about 425° C. or less, for example about 400° C. or less or about 350° C. or less; a total pressure of at least about 300 psig (about 2.1 MPag), for example at least about 350 psig (about 2.4 MPag) or at least about 400 psig (about 2.8 MPag); a total pressure of about 3000 psig (about 20.7 MPag) or less, for example about 1500 psig (about 10.3 MPag) or less, about 800 psig (about 5.5 MPag) or less, or about 500 psig (about 3.4 MPag) or less; a hydrogen partial pressure of at least about 20 psia (about 140 kPaa), for example at least about 25 psia (about 170 kPaa), at least about 50 psia (about 350 kPaa), or at least about 100 psia (about 690 kPaa); a hydrogen partial pressure of about 500 psia (about 3.4 MPaa) or less, for example about 350 psia (about 2.4 MPaa) or less, about 250 psia (about 1.7 MPaa) or less, or about 175 psia (about 1.2 MPaa) or less; a liquid hourly space velocity (LHSV) of at least about 0.1 $hr^{-1}$, for example at least about 0.3 $hr^{-1}$, at least about 0.5 $hr^{-1}$, or at least about 1.0 $hr^{-1}$; and an LHSV of about 15 $hr^{-1}$ or less, for example about 10 $hr^{-1}$ or less, about 5 $hr^{-1}$ or less, about 2.5 $hr_{-1}$ or less, about 2 $hr_{-1}$ or less, about 1.5 $hr^{-1}$ or less, or about 1.2 $hr^{-1}$ or less. Additionally or alternatively, the temperature, total pressure, hydrogen partial pressure, and LHSV for a liquid-continuous reactor can be conditions suitable for use in a trickle-bed reactor.

A suitable deoxygenation catalyst can contain at least one of Group VIB and/or Group VIII metals, optionally on a support. Examples of suitable (optional) support materials can include alumina, silica, titania, zirconia, silica-alumina, combinations thereof, or any other suitable refractory material. Examples of Group VIB metals can include molybdenum and/or tungsten. Examples of Group VIII materials can include nickel, cobalt, iron, platinum, and/or palladium. Generally, the amount of Group VIB metal can be at least about 1 wt %, for example at least about 5 wt % or at least about 10 wt %. Additionally or alternatively, the amount of Group VIB metal can be about 25 wt % or less, for example about 20 wt % or less or about 15 wt % or less. Further additionally or alternatively, the amount of Group VIII metal can be at least about 0.5 wt %, for example at least about 1 wt %, at least about 2 wt %, or at least about 5 wt %. Still further additionally or alternatively, the amount of Group VIII metal can be about 30 wt % or less, for example about 25 wt % or less, about 20 wt % or less, about 15 wt % or less, or about 10 wt % or less. In embodiments where a Group VIII noble metal (e.g., platinum and/or palladium) is present, the amount of the Group VIII noble metal can be at least about 0.1 wt %, for example at least about 0.3 wt % or at least about 0.5 wt %, and/or can be about 3 wt % or less, for example about 2 wt % or less, about 1.5 wt % or less, about 1.0 wt % or less, about 0.8 wt % or less, or about 0.7 wt % or less. One specific example of a deoxygenation catalyst can include from about 1 wt % to about 5 wt % of Co and about 4 wt % to about 20 wt % of Mo supported on a suitable support (e.g., silica, alumina, titania, silica-alumina, or a combination thereof). Another specific example of a deoxygenation catalyst can be a catalyst that includes from about 1 wt % to about 5 wt % of Ni and about 4 wt % to about 20 wt % of Mo and/or W, supported on a suitable support. In some embodiments, the deoxygenation catalyst can be catalyst with a relatively lower level of hydrogenation activity, such as a catalyst containing Co as a Group VIII metal, as opposed to a catalyst containing Ni, Pt, or Pd as a Group VIII metal. Additionally or alternatively, at least a portion of one or more deoxygenation catalyst beds and/or stages can include an additional type of catalyst, such as a hydrocracking catalyst, a hydrofinishing catalyst, a dewaxing catalyst, or a combination thereof.

In embodiments where excess gas is vented off from the liquid, the available hydrogen in the reactor can typically correspond to the amount of hydrogen dissolved in the liquid phase. Thus, a higher treat gas rate may not lead to an increase in the amount of available hydrogen. In this type of situation, the amount of hydrogen gas available for consumption may be dependent on the solubility limit of the feedstock. The hydrogen solubility limit for a typical hydrocarbon feedstock can be from about 30 scf/bbl (about 5 $Nm^3/m^3$) to about 200 scf/bbl (about 34 $Nm^3/m^3$).

The hydrogen need for a biocomponent feedstock can vary widely, and can be in excess of about 1000 scf/bbl (about 170 $Nm^3/m^3$) or even in excess of 1500 scf/bbl (about 250 $Nm^3/m^3$). However, the hydrogen need for the hydrotreated mineral effluent should be relatively low, as it has already been subject to heteroatom removal. Similarly, the recycled product has previously been deoxygenated, and should also have a relatively low hydrogen consumption. As a result, the overall hydrogen need for the deoxygenation stage can be controlled by controlling the amount of biocomponent feed, relative to the other combined components, namely the hydrotreated mineral feed and the recycled product. In an embodiment, the overall hydrogen need for the deoxygenation stage can be about 800 scf/bbl (about 140 $Nm^3/m^3$) or less, for example about 600 scf/bbl (about 100 $Nm^3/m^3$) or less, about 500 scf/bbl (about 85 $Nm^3/m^3$) or less, about 400 scf/bbl (about 70 $Nm^3/m^3$) or less, or about 250 scf/bbl (about 42 $Nm^3/m^3$) or less. Additionally or alternatively, the overall hydrogen need can be at least about 150 scf/bbl (about 25 $Nm^3/m^3$), for example at least about 200 scf/bbl (about 34 $Nm^3/m^3$), at least about 250 scf/bbl (about 42 $Nm^3/m^3$), at least about 300 scf/bbl (about 50 $Nm^3/m^3$), or at least about 400 scf/bbl (about 68 $Nm^3/m^3$). When the total hydrogen need for the deoxygenation stage is expressed relative to the hydrogen need of the same volume of a feed containing only the biocomponent feed, the total hydrogen need for the deoxygenation stage can additionally or alternatively be at least about 20% of the hydrogen need for the same volume of a corresponding biocomponent feed, for example at least about 30% or at least about 40%. Further additionally or alternatively, the total hydrogen need for the deoxygenation stage can be about 70% or less of the hydrogen need for the same volume of a corresponding biocomponent feed, for example about 60% or less, about 50% or less, or about 40% or less.

After deoxygenation, the effluent from the second stage can be separated and/or stripped to isolate and/or remove contaminant gases such as CO and/or $CO_2$. Optionally, the isolation/removal process can also be used to remove light ends and/or other relatively low boiling molecules. In some embodiments, after removal of contaminant gases, at least a portion of the liquid effluent from the deoxygenation reaction can be combined with at least a portion of the product effluent from the hydrotreatment of the mineral feed. Additionally or alternatively, optionally but preferably after separating out light ends, the effluent from the deoxygenation reaction can be split into a deoxygenated product stream and a recycled product stream. The recycled product stream can be combined with the slip stream from the mineral hydrotreatment stage for use as an input into the deoxygenation stage.

Diesel Product Properties

During hydrotreatment, the sulfur and nitrogen contents of the feedstock can preferably be reduced. With regard to sulfur, one or more hydrotreatment stages can advantageously reduce the sulfur content to a suitable level, such to about 1000 wppm or less, for example about 500 wppm or less, about 100 wppm or less, about 50 wppm or less, about 30 wppm or less, about 20 wppm or less, about 15 wppm or less, about 10 wppm or less, or about 5 wppm or less. With regard to nitrogen, the hydrotreating stage(s) can additionally or alternately reduce the nitrogen content of the feed to about 100 wppm or less, for example about 50 wppm or less, about 20 wppm or less, about 15 wppm or less, about 10 wppm or less, about 5 wppm or less, or about 3 wppm or less.

The deoxygenation process can be used to substantially deoxygenate a feedstock, which can correspond to removing at least 90 mol %, for example at least 95 mol %, at least 98 mol %, or at least 99 mol % of the oxygen present, and/or which can correspond to reducing the oxygenate level to 0.1 wt % or less, for example 0.05 wt % or less, 0.01 wt % or less, or 0.005 wt % or less) the biocomponent or other oxygen-containing feedstock. Deoxygenating a feed can avoid problems with catalyst poisoning and/or deactivation due to the creation of water or carbon oxides during hydroprocessing.

In some embodiments, at least a portion of the products from the mineral hydrotreatment stage and from the deoxygenation stage can be combined to provide a single product stream. Additionally or alternately, at least a portion of the product from the deoxygenation stage can have value as a second, separate product from the hydrotreated mineral product. In embodiments where the deoxygenated product is not combined with the effluent from the mineral hydrotreatment stage, the characteristics of the deoxygenated product can be controlled, at least in part, by adjusting the ratio hydrotreated mineral effluent added to the liquid-continuous stage relative to the amount of biocomponent feed. Adding more of the hydrotreated feed relative to the biocomponent feed into the deoxygenation stage may improve the cold flow properties of the resulting deoxygenated feed, as compared to the cold flow properties of a deoxygenated product produced from only the biocomponent feed.

Divided Wall Column Configuration

In an embodiment where separate product streams are produced by the mineral hydrotreatment stage and the deoxygenation stage, a divided wall column can be used as a stripper, e.g., to reduce the amount of equipment needed for the process. In such an embodiment, contaminant gases such $H_2S$ and $NH_3$ can be separated out from the effluent of the mineral hydrotreatment stage. The remaining liquid effluent can then be passed into a separated volume in the divided wall column. Similarly, contaminant gases such as CO and $CO_2$ can be separated from the effluent of the deoxygenation stage. The remaining effluent can then be passed into a second separated volume in the divided wall column. The divided wall column can be used as a stripper for removing lighter fractions and/or contaminants from the effluents of both stages, while still maintaining the separate diesel fuel products from each stage.

A divided wall column can contain at least three separate volumes. One of the volumes is a common volume, typically located toward the top of the divided wall column. The remaining volumes in the divided wall column can represent volumes separated from each other by a dividing wall. The various volumes are all in fluid communication with each other via the common volume. However, petroleum fractions with a sufficiently high boiling point should typically not be able to travel up the column to a sufficient height to reach the common volume, for example thus effectively fractionating the petroleum fractions by boiling point.

In various embodiments below, the divided wall column is described as having one common volume and two separated volumes. However, a divided wall column could also have three or more separated volumes, so long as there is at least one common volume shared between at least two of the separated volumes and as many as all of the separated volumes.

The volumes can be arranged in any configuration convenient for the desired fractionations. One option is to have each of the separated volumes occupy roughly equal portions of the divided section. For example, a divided wall column with two separated areas and one common area above could have each of the separated areas occupy roughly half of the lower portion of the divided wall column. Similarly, a divided wall column with three separated areas could have each separated area occupy approximately a third of the lower portion. Alternatively, more than one, or each, of the separated areas can have different volumes, which, depending on the conditions under which the divided wall column is operated, may be proportioned relative to the amounts of each volume expected.

In various embodiments, the position of the dividing wall can be any convenient position that leads to the appropriate volumes for the separated areas. For a divided wall column having a roughly rounded cylindrical shape, one option includes having a dividing wall that corresponds to a diameter of the column, which would produce two separated areas with roughly equal volumes. Another option includes having a dividing wall that corresponds to a chord connecting two points on the circumference of the rounded shape or to a pie wedge involving roughly two radii of the rounded shape, thus leading to different volumes in each separated area. Still another option includes having a dividing wall that creates concentric circular volumes for the separated portions. While it is believed that roughly rounded cylindrical shapes are preferred for the external shell of divided wall columns, the above placements for a dividing wall can be equally applied to columns having other shapes.

In an embodiment, the dividing wall can have a height that is tall enough to allow for removal of two or more fractions from a separated volume within the column. This means that at least two fractions that do not mix with the common volume can be removed from a separated area. In one embodiment, the dividing wall can have a height that is sufficient to allow for removal of two or more fractions from each of the separated volumes.

In another embodiment, the height of the dividing wall can be selected based on controlling the amount of contamination between the multiple product fractions produced by the column. For example, in a divided wall column that produces diesel fractions, the separated volumes can be used to produce two diesel fractions of different quality, such as one diesel fraction with a higher amount of sulfur and a second diesel fraction that satisfies a more stringent specification (i.e., having a lower sulfur content). In such an example, it may be desirable to limit the amount of exchange that occurs between the two diesel fractions. To limit such exchange, the height of the dividing wall can be selected to limit the amount of "contamination" between the fractions. In an embodiment, the dividing wall can have a sufficient height so that less than about 10 wt % of the product from a first separated volume corresponds to substances from a second separated volume, for example less than about 5 wt %, less than about 1 wt %, less than about 0.1 wt %, or less than about 0.05 wt %. The amount of contamination allowed/desired can be dependent on the nature of the product. For example, if contamination can cause a product to fall outside of a government-mandated specification or other requirement, the dividing wall height can be selected to limit contamination to a more stringent level, such as less than about 0.1 wt % or less than about 0.05 wt %. Alternately, if the desire to reduce contamination is due merely to decrease in product value with a decrease in purity, the dividing wall height could be balanced against other economic considerations. In an embodiment, simulations and/or model compound experiments can be used to determine an appropriate dividing wall height.

Additionally or alternately, the height of the dividing wall can be selected based on the location of a condensing zone in the column. For a given product produced by a distillation column, the condensing zone or stage for the product can represent an upper limit for the expected height of travel for vapor of the given product. For the example of preventing contamination between diesel fractions, selecting a dividing wall height corresponding to the condensing zone for a diesel fraction would be expected to limit contamination to about 3 wt % or less, for example to about 1 wt % or less, to about 0.1 wt % or less, or to about 0.05 wt % or less.

Further additionally or alternatively, the height of the dividing wall can be selected in relation to one or more features of the divided wall column. For example, the height of the dividing wall can be selected to correspond approximately to the height between the bottom of the column and the height of the flash zone. Still further additionally or alternatively, the height of the dividing wall can correspond to the height of the bottom section of trays in the column.

Yet further additionally or alternatively, the height of the dividing wall can be at least about 15% of the height of the divided wall column, for example at least about 25% or at least about 30%. Again additionally or alternatively, the height of the dividing wall can be about 75% or less of the height of the divided wall column, for example about 60% or less, about 50% or less, about 40% or less, or about 30% or less. In additional or alternate embodiments, the height of the divided wall column can be about 75 meters or less, for example about 50 meters or less, about 35 meters or less, about 25 meters or less, or about 15 meters or less.

In embodiments where a divided wall column is replacing one or more existing fractionation columns, the diameter of a divided wall column can be selected so that the cross-sectional areas of the separate volumes roughly correspond to the cross-sectional areas of the individual fractionation columns that are being replaced. In an embodiment, the cross-sectional areas of the separate volumes can be within about 10% or less of the cross-sectional areas of the individual fractionation columns being replaced, or within about 5% or less.

In most practical embodiments, the interior of the divided wall column can include typical components of a fractionator. For example, a series of trays can be located in the divided wall column to assist with fractionation. Some of the trays can be located in the common volume. Other trays can be located in the separate volumes. The tray locations and/or spacing in the separate volumes can be the same or different in each volume. As an alternative to trays, any other type of internal structure typically found in a fractionator can be used, such as random packings, structured packings, grids, liquid and/or vapor distributors, liquid and/or vapor collectors, or the like, or combinations thereof The divided wall column can additionally or alternatively include other typical fractionator elements, such as a flash zone and/or a sump.

Exemplary Reaction Systems

A schematic representation of a reaction system suitable for carrying out the above processes is shown in FIG. 1. In FIG. 1, a mineral hydrocarbon feedstock 105 is introduced into a first hydrotreatment reactor 110. A hydrogen treat gas stream 108 can also be introduced into hydrotreatment reactor 110. The hydrocarbon feedstock can be exposed to hydrotreating conditions in first hydrotreatment reactor 110 in the presence of one or more catalyst beds that contain hydrotreating catalyst. The hydrotreatment can reduce the sulfur content of the treated feedstock, e.g., to less than about 1000 wppm, less than about 500 wppm, less than about 50 wppm, less than about 30 wppm, less than about 20 wppm, less than about 15 wppm, or less than about 10 wppm.

The hydrotreated feedstock 113 can flow from hydrotreatment reactor 110 into a hot, high pressure separation stage 120, where a gas-phase portion can be separated from liquid phase products. In FIG. 1, separation stage 120 can produce a hydrotreated liquid stream 123 and a gas-phase stream 124. The gas-phase stream 124 can contain hydrogen, e.g., that can be purified for recovery and/or recycle in hydrotreating/deoxygenation reactors in this process and/or in other processes, such as within the same refinery. Optionally, the hydrogen from stream 124 can be recycled for use as part of the input hydrogen stream 108. The hydrotreated liquid stream 123 can then be passed to device 130, which can be a stripper, a fractionator, or the like, or a combination thereof. In FIG. 1, a liquid effluent stream 159 from the deoxygenation stage can also enter device 130 with the hydrotreated liquid stream 123. Device 130 can be used to make a diesel boiling range product, e.g., by removing light ends and naphtha from the liquid effluent. The lower boiling molecules can be removed via output 134. A diesel boiling range product 137 can advantageously be produced, as well as a side stream 133 of the hydroprocessed mineral feedstock.

The side stream 133 from the device 130 can then be passed to the liquid-continuous deoxygenation reactor 140. Prior to and/or immediately upon entering reactor 140, the side stream 133 can be combined with biocomponent feed 145. The combined feed can then be exposed to hydrogen for fully or partially dissolving therein, e.g., by adding a hydrogen stream 138 to side stream 133 and then mixing the streams in static mixer 136. Optionally, the liquid may be flashed after leaving the static mixer to remove excess gas. Additionally or alternatively, excess gas in the liquid leaving the static mixer may be vented directly from reactor 140.

After mixing, the fully or partially hydrogen-saturated (in this context, physically not chemically) side stream 133 and the biocomponent feed 145 can enter reactor 140. The mixture of the side stream and biocomponent feed can be deoxygenated to produce a deoxygenated effluent 143. The deoxygenated effluent can then be separated in separator 150 into a contaminant gas-phase stream 154 and a liquid stream 159. The contaminant gas-phase stream 154 can have a relatively low hydrogen content, such that there may not be a need for the hydrogen in stream 154 to be recycled. Liquid stream 159 can be added to the input flow to device 130 to form a diesel fuel product.

Figure 2:
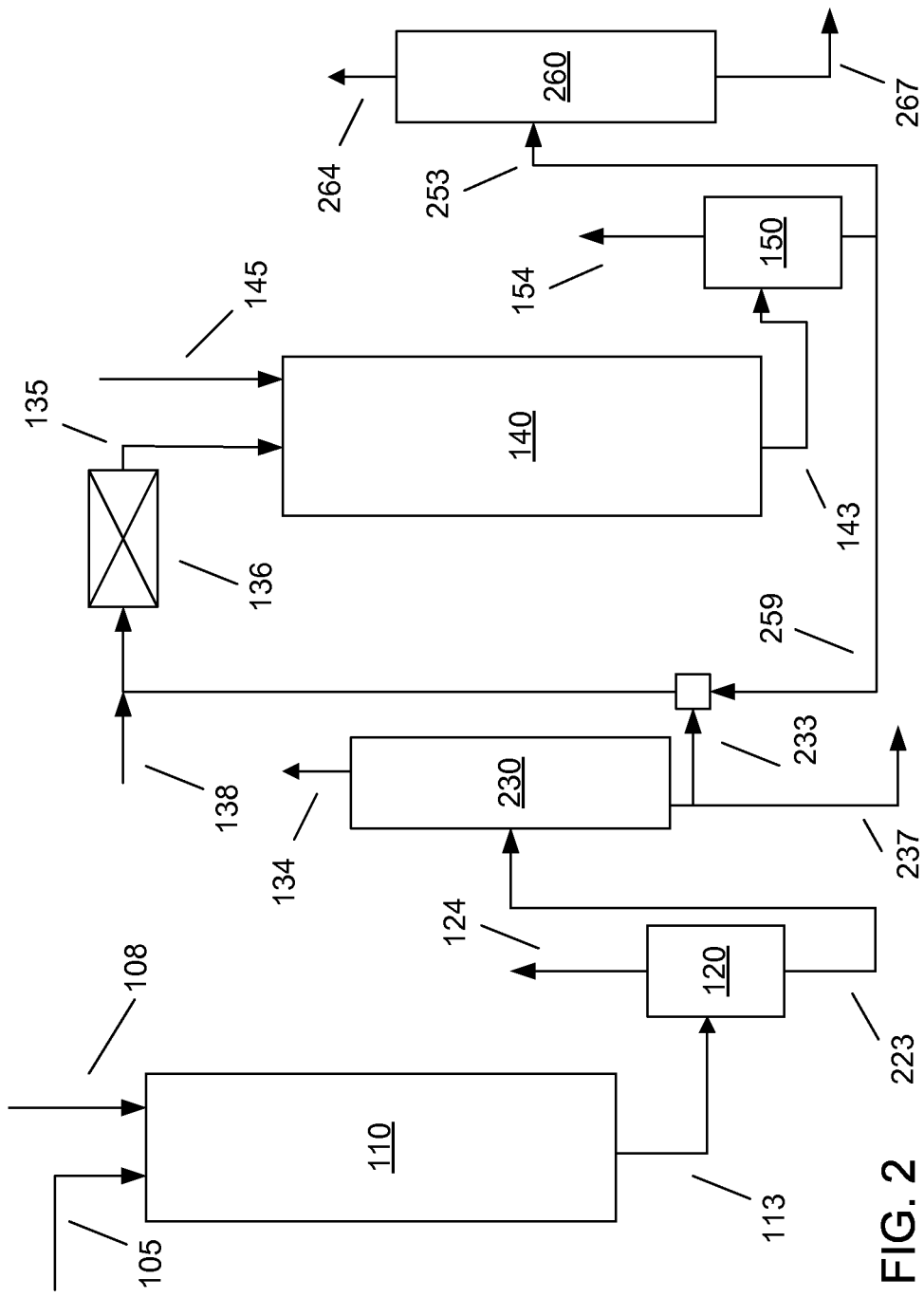
FIG. 2 schematically shows a reaction system according to an embodiment of the invention.

FIG. 2 schematically shows an alternate configuration according to an embodiment of the invention. In FIG. 2, two separate diesel boiling range products are produced. One product corresponds to just the hydrotreated mineral feed, while the second product corresponds to a mixture of the hydrotreated mineral feed and the biocomponent feed. In FIG. 2, features similar to FIG. 1 are indicated with an identical number. The differences relative to the embodiment shown in FIG. 1 begin with device 230, which, like device 130, can be a stripper, a fractionator, or the like, or a combination thereof In FIG. 2, device 230 can receive the liquid output 223 from separation device 120. However, device 230 preferably does not receive a liquid output from the deoxygenation stage. Thus, the low boiling stream 234, diesel boiling range product 237, and side stream 233 can be based only on the liquid effluent from the mineral hydrotreating stage 110. The liquid output from the deoxygenation stage separator 150 can instead be split into a recycled product portion 259 and a biocomponent liquid portion 253. The biocomponent liquid portion 253 can be stripped or fractionated in stripper 260 to remove a light ends and/or naphtha stream 264. This can result in a second diesel boiling range product 267.

Figure 3:
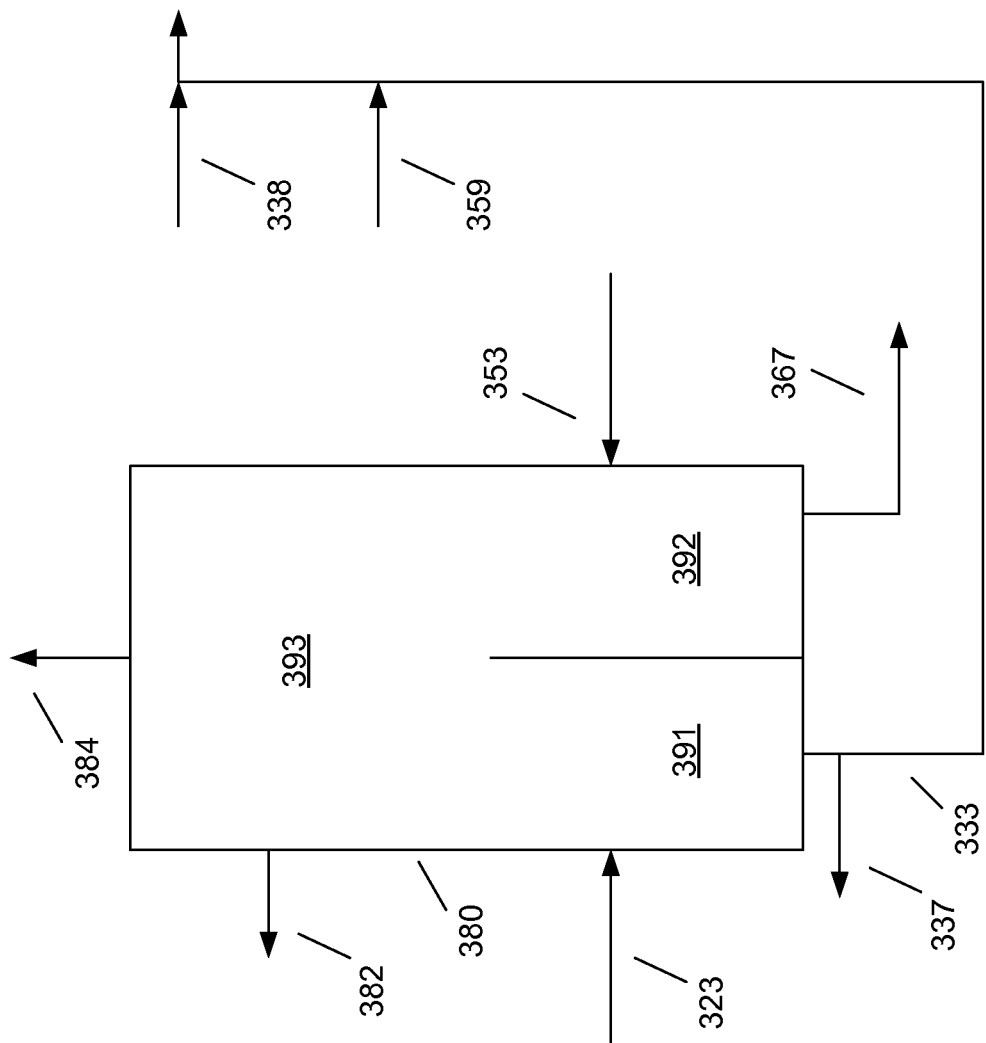
FIG. 3 schematically shows a portion of a reaction system according to an embodiment of the invention.

FIG. 3 schematically shows a portion of another alternative configuration according to an embodiment of the invention. In FIG. 3, the amount of equipment required to generate two distinct diesel boiling range products can be reduced by using a divided wall column stripper or fractionator. In FIG. 3, a divided wall column stripper 380 can be used to replace device 130 and stripper 260 shown in FIG. 2. The separated liquid phase effluent 323 from the mineral hydrotreatment stage can enter a first separate volume 391 of the divided wall column stripper 380. The liquid output from first separate volume 391 can be used to form a diesel boiling range product stream 337 and a side stream 333. The side stream 333 can be combined with a hydrogen stream 338 and a recycled product stream 359 from the deoxygenation stage. This combined stream can be passed through a mixer to at least partially dissolve hydrogen in the stream, e.g., to approximately the solubility limit, prior to entering the deoxygenation stage. The separated liquid phase output 353 from the deoxygenation stage can enter a second separated volume 392 of the divided wall column stripper 380. Note that, in FIG. 3, liquid phase output 353 is referred to as a separated liquid phase output. Typically, contaminant gases such as CO and/or $CO_2$ can be removed before liquid phase output 353 is sent to the divided wall column stripper 380. This can reduce the amount of equipment exposed to any corrosive environment that can be generated due to the presence of corrosive contaminants such as CO and/or $CO_2$. Separated volume 392 can generate a second diesel boiling range product 367 based on the liquid output from the deoxygenation stage. The gas-phase products generated in divided wall column stripper 380 can be combined in a common volume 393. The common volume can generate a light ends stream 384 and optionally a naphtha stream 382.

In the embodiments shown in FIGS. 1-3, the stripping and/or fractionation stages are shown as producing one liquid phase product. In other embodiments, a stripping and/or fractionation stage can be configured to generate multiple (i.e., two or more) products. For example, a stripping stage can be configured to generate a separate kerosene fraction, in addition to a diesel boiling range product.

Figure 4:
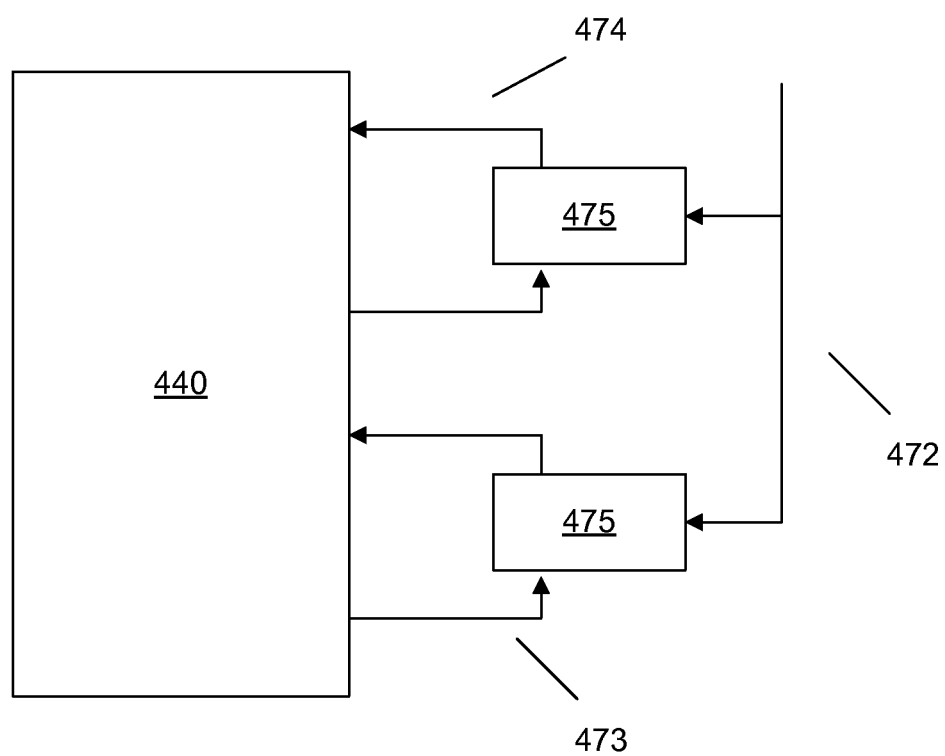
FIG. 4 schematically shows a portion of a reaction system according to an embodiment of the invention.

FIG. 4 schematically shows an option for introducing hydrogen into a liquid-continuous reactor at one or more intermediate locations in the reactor. In FIG. 4, two mixers 475 are shown for mixing hydrogen with a liquid. Side streams of liquid 473 can be removed from reactor 440 and introduced into mixers 475. The mixers can at least partially dissolve hydrogen from hydrogen stream 472 into the liquid streams 473. The (physically, not chemically) hydrogen-saturated liquid 474 can then be returned to the reactor 440.

Additional Embodiments

Additionally or alternately, the invention can include one or more of the following embodiments.

Embodiment 1. A method for making a diesel fuel product, comprising: contacting a mineral feedstock having a sulfur content of at least about 500 wppm with a hydrotreating catalyst under effective hydrotreating conditions in a hydrotreatment reactor that includes a continuous gas phase to make a hydrotreated effluent; separating the hydrotreated effluent into at least a first diesel boiling range product, a hydrotreated liquid slip stream, and a gas phase product, the diesel boiling range product and the hydrotreated liquid slip stream having a sulfur content of about 50 wppm or less; mixing the hydrotreated liquid slip stream with a recycled product stream, and a biocomponent feed having an oxygen content of at least about 8 wt %, to form a mixed input stream; deoxygenating the mixed input stream under effective deoxygenation conditions in a deoxygenation stage having a continuous liquid phase environment to form a second diesel boiling range product and the recycled product stream, the mixed input stream having a first hydrogen need in the deoxygenation; and adjusting a ratio of the hydrotreated liquid slip stream and the biocomponent feed in the mixed input stream while maintaining a second hydrogen need of the mixed input stream in the deoxygenation to within about 5% of the first hydrogen need.

Embodiment 2. A method for making a diesel fuel product, comprising: contacting a mineral feedstock having a sulfur content of at least about 500 wppm with a hydrotreating catalyst under effective hydrotreating conditions in a hydrotreatment reactor that includes a continuous gas phase to make a hydrotreated effluent; separating the hydrotreated effluent to form a hydrotreated liquid effluent and a gas phase effluent containing $H_2S$ and $H_2$; passing the hydrotreated liquid effluent into a first separate volume of a divided wall column stripper; stripping the hydrotreated liquid effluent in the first separate volume to form a light ends fraction, a diesel boiling range product, and a hydrotreated liquid slip stream, the light ends fraction being passed into a common volume of the divided wall column stripper, the diesel boiling range product and the hydrotreated liquid slip stream having a sulfur content of about 50 wppm or less; mixing the hydrotreated liquid slip stream with a recycled product stream, and a biocomponent feed having an oxygen content of about 8 wt %, to form a mixed input stream; deoxygenating the mixed input stream under effective deoxygenation conditions in a deoxygenation stage having a continuous liquid phase environment to form a deoxygenated effluent; separating the deoxygenated effluent to form a deoxygenated liquid effluent and a second gas phase effluent containing $CO_2$ and CO; passing the deoxygenated liquid effluent into a second separate volume of a divided wall column stripper; and stripping the deoxygenated liquid effluent in the second separate volume to form a second light ends fraction, a second diesel boiling range product, and the recycled product stream, the second light ends fraction being passed into the common volume of the divided wall column stripper.

Embodiment 3. The method of embodiment 1 or embodiment 2, wherein the effective deoxygenation conditions include a temperature from about 260° C. to about 425° C., an LHSV from about 0.1 $hr^{-1}$ to about 10.0 $hr^{-1}$, and a total pressure from about 300 psig (about 2.1 MPag) to about 1500 psig (about 10.3 MPag).

Embodiment 4. The method of any one of the previous embodiments, wherein the effective hydrotreating conditions include a temperature from about 500° F. (about 260° C.) to about 800° F. (about 427° C.), a total pressure from about 200 psig (about 1.4 MPag) to about 3000 psig (about 20.7 MPag), an LHSV from about 0.2 $hr^{-1}$ to about 15 $hr^{-1}$, and a hydrogen treat gas rate from about 500 scf/bbl (about 85 $Nm^3/m^3$) to about 10000 scf/bbl (about 1700 $Nm^3/m^3$).

Embodiment 5. The method of any one of the previous embodiments, wherein the deoxygenating comprises: removing a portion of the mixed input stream from the deoxygenation stage; dissolving hydrogen in the removed portion; and passing the removed portion containing the dissolved hydrogen back into the deoxygenation stage.

Embodiment 6. The method of any one of the previous embodiments, further comprising dissolving hydrogen into the mixed input stream prior to deoxygenating the mixed input stream.

Embodiment 7. The method of embodiment 6, wherein the amount of hydrogen dissolved into the mixed input stream corresponds to approximately the solubility limit of hydrogen in the mixed input stream.

Embodiment 8. The method of any one of the previous embodiments, wherein the hydrogen consumption relative to a total flow into the deoxygenation stage is about 250 scf/bbl (about 42 $Nm^3/m^3$) or less.

Embodiment 9. The method of any one of the previous embodiments, wherein the oxygen content of the deoxygenated feed is about 1 wt % or less.

Embodiment 10. The method of any one of the previous embodiments, further comprising combining the first diesel boiling range product and the second diesel boiling range product to form a combined diesel product.

EXAMPLE

The following is a prophetic example. An atmospheric gas oil is selected as a mineral feedstock. The feedstock has a boiling range between about 175° C. and about 425° C. The sulfur content of the feed is about 4000 wppm. The feed is hydrotreated in a trickle-bed reactor (with reactor beds having a continuous gas-phase environment) under effective hydrotreating conditions. The catalyst includes nickel and molybdenum on an alumina support. The hydrotreated effluent is then separated into a diesel fuel product stream, a gas-phase stream for recapture of recycled hydrogen, and a hydrotreated liquid slip stream. The sulfur content of the hydrotreated liquid slip stream and diesel fuel product stream is about 10 wppm or less.

A biocomponent stream including fatty acid methyl esters (FAME) is selected as a biocomponent feedstock. The biocomponent stream has an oxygen content of about 10 wt %, and an expected hydrogen consumption of about 1500 scf/bbl (about 250 $Nm^3/m^3$). A blend of the hydrotreated liquid slip stream, the FAME biocomponent stream, and the recycled product from the continuous-liquid reactor are combined with a make-up hydrogen stream and are mixed in a static mixer to dissolve hydrogen in the liquid to approximately the solubility limit.

The (physically not chemically) hydrogen-saturated input stream then enters a deoxygenation reactor with catalyst beds in a continuous liquid phase environment. The deoxygenation catalyst is a NiMo catalyst on an alumina support. The (physically not chemically) hydrogen-saturated input stream is deoxygenated under effective deoxygenation conditions. The hydrogen consumption in the stage, based on the total input into the stage, is about 220 scf/bbl (about 37 $Nm^3/m^3$). This is lower than the need for the raw biocomponent feed, due to the minimal hydrogen consumption for the hydrotreated liquid slip stream and the recycled product stream. To increase the available hydrogen in the reactor, streams of partially deoxygenated product are withdrawn at three separate downstream locations. Hydrogen is dissolved in these streams, e.g., each to approximately the solubility limit, and the (physically not chemically) hydrogen-saturated streams are introduced back into the reactor. The resulting diesel boiling range product, after separation and/or stripping, has a sulfur content of less than about 10 wppm and an oxygen content of less than about 1 wt %.

The mix of hydrotreated liquid, recycled product, and biocomponent feed is then changed from the ratio of about 3:3:1 to a ratio of about 2:4:1. The total flow into the reactor is approximately preserved, as well as the approximate ratio of fresh biocomponent feed to feed with a minimal hydrogen need (the other two streams). Thus, the hydrogen consumption for the total flow into the stage remains at about 220 scf/bbl (37 $Nm^3/m^3$). Reducing the amount of the hydrotreated liquid slip stream increases the amount of diesel fuel product directly generated from the hydrotreatment of the atmospheric gas oil.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A method for making a diesel fuel product, comprising:
contacting a mineral feedstock having a sulfur content of at least about 500 wppm with a hydrotreating catalyst under effective hydrotreating conditions in a hydrotreatment reactor that includes a continuous gas phase to make a hydrotreated effluent;
separating the hydrotreated effluent into at least a first diesel boiling range product, a hydrotreated liquid slip stream, and a gas phase product, the diesel boiling range product and the hydrotreated liquid slip stream having a sulfur content of about 50 wppm or less;
mixing the hydrotreated liquid slip stream with a recycled product stream, and a biocomponent feed having an oxygen content of at least about 8 wt %, to form a mixed input stream;
deoxygenating the mixed input stream under effective deoxygenation conditions in a deoxygenation stage having a continuous liquid phase environment to form a second diesel boiling range product and the recycled product stream, the mixed input stream having a first hydrogen need in the deoxygenation;
removing a portion of the mixed input stream from the deoxygenation stage; dissolving hydrogen in the removed portion;
and passing the removed portion containing the dissolved hydrogen back into the deoxygenation stage;
and adjusting a ratio of the hydrotreated liquid slip stream and the biocomponent feed in the mixed input stream while maintaining a second hydrogen need of the mixed input stream in the deoxygenation to within about 5% of the first hydrogen need.

2. The method of claim 1, wherein the effective deoxygenation conditions include a temperature from about 260° C. to about 425° C., an LHSV from about 0.1 $hr^{-1}$ to about 10.0 $hr^{-1}$, and a total pressure from about 300 psig (about 2.1 MPag) to about 1500 psig (about 10.3 MPag).

3. The method of claim 1, wherein the effective hydrotreating conditions include a temperature from about 500° F. (about 260° C.) to about 800° F. (about 427° C.), a total pressure from about 200 psig (about 1.4 MPag) to about 3000 psig (about 20.7 MPag), an LHSV from about 0.2 $hr^{-1}$ to about 15 $hr^{-1}$, and a hydrogen treat gas rate from about 500 scf/bbl (about 85 $Nm^3/m^3$) to about 10000 scf/bbl (about 1700 $Nm^3/m^3$).

4. The method of claim 1, further comprising dissolving hydrogen into the mixed input stream prior to deoxygenating the mixed input stream.

5. The method of claim 4, wherein the amount of hydrogen dissolved into the mixed input stream corresponds to approximately the solubility limit of hydrogen in the mixed input stream.

6. The method of claim 1, wherein the hydrogen consumption relative to a total flow into the deoxygenation stage is about 250 scf/bbl (about 42 $Nm^3/m^3$) or less.

7. The method of claim 1, wherein the oxygen content of the deoxygenated feed is about 1 wt % or less.

8. The method of claim 1, further comprising combining the first diesel boiling range product and the second diesel boiling range product to form a combined product.

9. A method for making a diesel fuel product, comprising:
contacting a mineral feedstock having a sulfur content of at least about 500 wppm with a hydrotreating catalyst under effective hydrotreating conditions in a hydrotreatment reactor that includes a continuous gas phase to make a hydrotreated effluent;

separating the hydrotreated effluent to form a hydrotreated liquid effluent and a gas phase effluent containing $H_2S$ and $H_2$;

passing the hydrotreated liquid effluent into a first separate volume of a divided wall column stripper;

stripping the hydrotreated liquid effluent in the first separate volume to form a light ends fraction, a diesel boiling range product, and a hydrotreated liquid slip stream, the light ends fraction being passed into a common volume of the divided wall column stripper, the diesel boiling range product and the hydrotreated liquid slip stream having a sulfur content of about 50 wppm or less;

mixing the hydrotreated liquid slip stream with a recycled product stream, and a biocomponent feed having an oxygen content of about 8 wt %, to form a mixed input stream;

deoxygenating the mixed input stream under effective deoxygenation conditions in a deoxygenation stage having a continuous liquid phase environment to form a deoxygenated effluent;

removing a portion of the mixed input stream from the deoxgenation stage; dissolving hydrogen in the removed portion;

and passing the removed portion containing the dissolved hydrogen back into the deoxygenation stage;

separating the deoxygenated effluent to form a deoxygenated liquid effluent and a second gas phase effluent containing $CO_2$ and CO;

passing the deoxygenated liquid effluent into a second separate volume of a divided wall column stripper;

and stripping the deoxygenated liquid effluent in the second separate volume to form a second light ends fraction, a second diesel boiling range product, and the recycled product stream, the second light ends fraction being passed into the common volume of the divided wall column stripper.

10. The method of claim 9, wherein the effective deoxygenation conditions include a temperature from about 260° C. to about 425° C., an LHSV from about 0.1 $hr^{-1}$ to about 10.0 $hr^{-1}$, and a total pressure from about 300 psig (about 2.1 MPag) to about 1500 psig (about 10.3 MPag).

11. The method of claim 9, wherein the effective hydrotreating conditions include a temperature from about 500° F. (about 260° C.) to about 800° F. (about 427° C.), a total pressure from about 200 psig (about 1.4 MPag) to about 3000 psig (about 20.7 MPag), an LHSV from about 0.2 $hr^{-1}$ to about 15 $hr^{-1}$, and a hydrogen treat gas rate from about 500 scf/bbl (about 85 $Nm^3/m^3$) to about 10000 scf/bbl (about 1700 $Nm^3/m^3$).

12. The method of claim 9, further comprising dissolving hydrogen into the mixed input stream prior to deoxygenating the mixed input stream.

13. The method of claim 12, wherein the amount of hydrogen dissolved into the mixed input stream corresponds to approximately the solubility limit of hydrogen in the mixed input stream.

14. The method of claim 9, wherein the hydrogen consumption relative to a total flow into the deoxygenation stage is about 250 scf/bbl (about 42 $Nm^3/m^3$) or less.

15. The method of claim 9, wherein the oxygen content of the deoxygenated feed is about 1 wt % or less.

16. The method of claim 9, further comprising combining the first diesel boiling range product and the second diesel boiling range product to form a combined diesel product.

\* \* \* \* \*